United States Patent [19]

Hathaway

[11] Patent Number: 4,890,703

[45] Date of Patent: Jan. 2, 1990

[54] RETENTION DEVICE FOR APPLICATION TO CONTROL CYLINDERS

[75] Inventor: Richard C. Hathaway, Greenville, Ohio

[73] Assignee: C. R. & I., Inc., Greenville, Ohio

[21] Appl. No.: 194,513

[22] Filed: May 16, 1988

[51] Int. Cl.$^4$ .......................... F16F 9/32; F15B 15/26; F16M 13/00

[52] U.S. Cl. ........................................ 188/300; 92/15; 248/561

[58] Field of Search ...................... 188/67, 300, 322.12; 267/64.12, 120, 124; 16/49, 84; 296/56, 76; 292/338, DIG. 61, DIG. 65; 248/351, 561, 563; 298/17 B, 22 R, 22 P; 92/15, 17, 19; 74/526, 527

[56] References Cited

U.S. PATENT DOCUMENTS

| | | | |
|---|---|---|---|
| 3,254,919 | 6/1966 | Birchmeier | 188/300 X |
| 3,662,653 | 5/1972 | Carlson et al. | 92/15 |
| 3,851,867 | 12/1974 | Fricko | 188/300 X |
| 4,744,548 | 5/1988 | Hathaway | 267/120 X |

FOREIGN PATENT DOCUMENTS

3417493 3/1985 Fed. Rep. of Germany .
2154698 9/1985 United Kingdom ................ 188/300

Primary Examiner—Robert J. Oberleitner
Attorney, Agent, or Firm—Jerome P. Bloom

[57] ABSTRACT

Apparatus applicable to the piston rod of a control cylinder inherently operable to selectively limit and control the extent of its retraction. A preferred illustrative embodiment, as applied in use, conforms to a generally L-shaped structure the long leg of which is slim, substantially uniform in width, at least in part transversely arcuate along the length of its inner operative surface, highly resistant to compression and has its base end pivotally connected to the short leg of said structure. Springs interposed between these legs in the pivotal interconnection thereof are established in a secure and stable relation thereto in a manner to positively apply in continuing bias on the long leg which induces it to incline to and over the length of the short leg to inherently form therewith an acute angle. These legs are so formed to lend the minimal amount of material of which they are comprised a very high degree of load bearing strength for their size. In the illustrative embodiment the short leg is so formed to have one end portion thereof mount in a substantially complete circumferentially encompassing relation to a portion of the length of the piston rod to which it applies to have the remainder of its length project rigidly therefrom and radially thereof, subsequent to which the long leg is pivotally connected in a biased relation thereto to complete the generally L-shaped structure of which they form a part.

17 Claims, 2 Drawing Sheets

RETENTION DEVICE FOR APPLICATION TO CONTROL CYLINDERS

BACKGROUND OF THE INVENTION

This invention relates to new and improved apparatus applicable to the piston rod of a control cylinder or like device constructed and arranged to functionally relate to said rod and its housing and to inherently operate upon a predetermined extended projection of the rod from its housing to selectively and positively limit the extent of its retraction and provide means by which to optionally and selectively maintain the rod in an extended projected relation to its housing as, to the extent and for the period of time required. Significant novelty is evidenced in its embodiments in the contour, form and interrelation of their component parts not only to each other but also to the piston rods and housings of the control cylinders to which they apply in use. The net result is that embodiments of the invention as compared to the prior art are easy, simple and most economical to fabricate, more efficient, satisfactory and safer in use and individually can be quickly and easily adapted for use in connection with a greater variety of cylinders the size and stroke of the piston rod of which may vary. Another improvement of the present invention is that embodiments may be provided in a form easily assembled and disassembled and quickly adapted by the most untutored of purchasers to enable their application to the piston rod of a number of different cylinders. The present invention is an extension of that subject of applicant's U.S. Pat. No. 4,744,548, issued May 17, 1988 entitled "Strut Retention Device" and reflects new and even more significant improvements in the art to which it relates.

Embodiments of the present invention are particularly advantageous for use in application to those gas struts and like devices intended to support hatchback, trunk lids and hoods of automotive vehicles and other closure panels in open condition as and when required. They will accordingly be described in this context, but only for purpose of illustration and not by way of limitation.

In spite of the slim and lightweight nature of their parts, embodiments of the invention are highly resistant to compression or deformation. Tests have demonstrated their ruggedness and strength renders embodiments of the invention capable of minimizing and even eliminating the occurrence of many accidents and injuries that have often heretofore taken place on unexpected failure of the fluid pressure upon which control cylinders normally depend for their intended function.

It will be self-evident from the detailed disclosure of the illustrative embodiments of the invention which follow that the above enumerated improvements solve a number of problems which have existed for an extended period of time in use of prior art devices designed for the same purpose.

The only information of which the present inventor is aware which appears to be pertinent in any respect to the subject matter of the present application may be found in applicant's aforementioned presently pending application for U.S. Letters Patent. Otherwise, the only prior art within the knowledge of the present inventor or those contributing to this disclosure is represented by the content of the following U.S. Pat. Nos.

2,996,210, Thomas;
3,306,656, Hughes;
3,708,825, Wood;
3,851,867, Fricko;
4,078,779, Moelders;

none of which appears specifically pertinent, in construction or application, to that which is herein set forth and particularly claimed.

SUMMARY OF THE INVENTION

Embodiments of the present invention, as applied in use, conform to a generally L-shaped structure the long leg of which is pivotally connected with and biased to incline to and over the short leg thereof. These legs are so formed and interrelated to lend the minimal amount of material of which each is comprised a very high degree of load bearing strength for its size and provide therebetween a simple but most stable pivotal interconnection. The short leg embodies means enabling a stable and very quick coupling thereof in a securely fixed relation to a portion of the length of the rod in a manner to normally establish the long leg, as and when the rod is retracted, along, closely adjacent and in part in bearing biased relation to one side of the cylinder housing to which the rod relates. The connection between the legs provides that when the rod is caused to have a predetermined projection from its housing a portion of the long leg, as it clears the end of the cylinder housing from which the rod projects, is inherently biased into a bearing relation to the rod to establish a limit to reverse movement and retraction of the rod until it is displaced therefrom sufficiently to clear the adjacent end of the cylinder housing on retraction of the rod.

In each embodiment the pivotal interconnection of its primary parts has a very high load accomodating capacity for the purpose to which it is applied and the connection is such to preclude inadvertent physical detachment of said parts under reasonable and normal conditions of its handling and usage.

In one form of a preferred embodiment of the invention, wherein it provides in use a substantially L-shaped structure, the short leg of said structure has one portion thereof adapted to form a collar which substantially wraps about the circumferential extent of a portion of the piston rod of the control cylinder to which said structure applies to position the remainder thereof in a rigid laterally projected relation thereto. In a particularly preferred embodiment of such structure the long leg thereof has the shape of a bar which is basically generally arcuate in transverse section, relatively thin in radial extent and portions of the length of its surface remote from that surface portion thereof which positions most adjacent the cylinder to which it applies in use distinguished by laterally spaced, longitudinally extending rib-like projections. In a contoured desirable form thereof the remote surface of said bar is transversely undulated and said rib-like projections are defined by laterally spaced peaked portions of said undulations.

Certain embodiments of the invention applicable to control cylinders are particularly advantageous in application to the support of a hatchback or rear deck closure panel or a trunk lid or hood of an automotive vehicle and other closure type panels in an open condition. The coupling portion thereof is so formed to enable an encompassing very quick and secure fit thereof to and about a portion of the length of a piston rod to securely mount in a perpendicular, laterally projected relation thereto. A linearly directed longitudinally extended component thereof, in a preferred embodiment, is relatively narrow, slim and arcuately contoured in transverse section, at least along a part of the inner surface portion thereof which applies to and bears on outer surface portions of the piston rod and the cylinder housing from which it projects in the course of use thereof for its intended purpose.

A further embodiment for application to a control cylinder to selectively limit and prevent the retraction of its piston rod into its housing provides a structure which is generally L-shaped as applied in use and comprises two distinct elements, one defining the long leg thereof which is a linearly directed, relatively slim, bar-shaped element the length of one surface of which is at least in part arcuate in transverse section and generally complementary in shape to circumferentially extending surface portions of the piston rod and housing of the cylinder to which said structure relates in use and the other being the relatively short leg of said structure which includes means for the internal coupling therein of a portion of the length of the piston rod of the control cylinder to which it applies in use and means to limit the retraction of said rod into its housing of said cylinder. Means are provided to effect a pivotal interconnection of said legs wherein biasing means interposed between said legs are operative to inherently induce an inclination of the long leg to and over said short leg. The long leg of said structure is constructed and arranged by means of said biased pivotal connection thereof to said short leg and the internal coupling therein by the short leg of a portion of the length of the piston rod of the cylinder to which it applies to extend, in the retracted condition of said rod, along its housing immediately of its outer surface to have at least a portion of said complementarily shaped surface thereof bear on said housing in a biased relation thereto and upon a predetermined projection of said rod from said housing automatically move inwardly to and bear on said rod in biased relation thereto to preclude a subsequent retraction of said rod inwardly of that position thereof defined by said predetermined projection thereof until it is displaced from said rod sufficient to clear the end of the housing from which said rod projects.

A further embodiment of the invention comprises a structure having a substantially L-shaped configuration as applied to a control cylinder including means defining a short leg and means defining a relatively long linearly directed leg which is relatively narrow and relatively uniform in width substantially from one end thereof to the other wherein said long leg is pivotally interconnected to said short leg and resilient means interposed between and anchored to said legs to inherently incline said long leg to and over said short leg and establish said long leg in a condition in which it inherently resists its displacement outwardly of said short leg. The short leg includes means for a secure mount and coupling thereof in encompassing relation to and in part in a substantially radially projected relation to a portion of the length of a piston rod, which is projected, at least in part, from the housing of a control cylinder of which it forms a part. The mode of said pivotal connection and disposition of biasing means between said legs provides a relative disposition of said legs which in the secured connection of said short leg to the piston rod to which it applies inherently adapts said long leg to position lengthwise of, alongside and immediately adjacent to the rod and to have at least a portion thereof substantially in bearing contact with the facing surface of the rod when said rod is sufficiently extended, said generally L-shaped structure presenting longitudinally spaced surface portions thereof which in the application of said structure to the rod, when said rod is sufficiently extended, are positioned in line with the end surface of the housing from which the rod projects and to selectively limit the movement of the projected portion of the rod into the cylinder housing.

Another embodiment provides apparatus for application to a projected portion of the piston rod of a control cylinder to selectively limit its retraction into the housing of the cylinder of which it forms a part comprising a linearly directed component having an pivotally connected coupling means including means for the engagement thereof to a portion of the piston rod of a control cylinder to project laterally therefrom. Said component is in this instance a slim longitudinally extended bar-shaped element which is relatively thin from face to face thereof and narrow in width substantially from one end thereof to the other and said coupling means is distinguished by a bifurcation thereof opening from one portion thereof the innermost limit of which intercepts a bore accommodating a portion of the length of a piston rod which projects therethrough and the outermost limit of which provides means through which said component is pivotally connected thereto. Said component is so formed and connected to said coupling means that by virtue of the application of said coupling means to and about a portion of a piston rod and its connection thereto aid component positions immediately of and lengthwise of the control cylinder to which it applies in a biased relation thereto and is adapted on the retraction of the piston rod to which it is coupled to extend over a portion of the length of the cylinder housing including that end from which the piston rod projects, to one side thereof, immediately of a portion of its outer surface, biased and at least in part in a firmly bearing relation thereto, said connection further provides means which on a predetermined projection of the piston rod produces a movement of said component outwardly with respect to the cylinder housing, said component being so conditioned that immediately on its clearing that end of the housing from which the rod projects it moves inwardly to and bears on the piston rod immediately of the end of the housing from which it projects to preclude further retraction of the rod until it is displaced to clear said end of the cylinder housing.

In most preferred embodiments the coupling means thereof forms a collar which substantially wraps about the circumferential extent of the portion of the piston rod of the control cylinder to which it applies.

With the foregoing in mind, it is to be understood that it is a primary object of the invention to provide a new and improved apparatus for simply and effectively setting and selectively maintaining a predetermined selective projected relation of a piston rod of a gas strut or like control cylinder with reference to the housing of the cylinder unit of which it forms a part which, as compared to the prior art, is not only most economical to manufacture, assemble and install but more efficient, effective and satisfactory in the application and particularly safe in use thereof.

An additional object of the invention is to provide such apparatus in the form of a generally L-shaped structure characterized by legs having a pivotally interconnected relation and contoured to lend the minimal amount of material of which they are comprised a very high degree of load bearing strength for their size and featuring a short leg which virtually provides a collar about the piston rod to which it applies and a rigid radially projected portion thereof to which the long leg of said structure is pivotally interconnected with biasing means interposed therebetween.

Another object is to provide embodiments of the invention applicable to the piston rod of control cylinders which are particularly advantageous in application to the support of a hatchback or rear deck closure panel or a trunk lid or hood of an automotive vehicle and other closure type panels in an open condition characterized by a coupling portion so formed to enable an encompassing very easy and secure fit thereof to and about a portion of the length of a piston rod of a control cylinder and, pivotally connected therewith, a linearly directed longitudinally extended component which is relatively narrow, slim and arcuately contoured in transverse section, at least along a part of the inner surface portion thereof which applies to and bears on outer surface portions of the piston rod and the cylinder housing from which it projects in the course of a use thereof for its intended purpose.

A further object is to provide such apparatus in the form of a substantially L-shaped structure the short leg of which has one portion thereof adapted to form a collar which substantially wraps about the circumferential extent of a portion of the piston rod of the control cylinder to which said structure applies in use to position the remainder thereof in a rigid laterally projected relation thereto and the long leg of which has a stable pivotal interconnection with said short leg and a configuration conforming to that of a bar which is basically generally arcuate in transverse section, relatively thin in radial extent and portions of the length of its surface remote from that surface portion thereof which positions the cylinder to which it applies in use distinguished by laterally spaced, longitudinally extending rib-like projections.

An additional object is to provide a new and improved apparatus for simply and effectively setting and selectively maintaining a predetermined selective projected relation of a piston rod of a gas strut or like device with reference to the housing of the cylinder unit of which it forms a part in the form of a generally L-shaped structure characterized by legs which have a pivotally interconnected relation, which legs are formed of a minimal amount of material having a very high degree of load bearing strength for their size and are so formed and interconnected to provide therebetween a substantially failsafe joint and in application and use thereof said longer leg is inherently biased to incline inwardly to and over the short leg, the latter of which is formed to facilitate its encompassing and secured connection thereof to the piston rod of the control cylinder to which it applies.

Another object of the invention is to provide a new and improved means and method for simply and effectively setting and maintaining a predetermined projected relation of a piston rod with reference to the housing of the control cylinder of which it forms a part, having a particularly advantageous application to closure panels, lids and hoods of automotive vehicles, possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the means and mode of application and operation as hereinafter described or illustrated in the accompanying drawings, or their equivalents.

Referring to the accompanying drawing wherein are shown some but obviously not necessarily the only forms of embodiment of the invention.

Like parts are indicated by similar numerals throughout the drawings.

FIGS. 1–11 of the drawings demonstrate the illustrative embodiment of the invention, as applied in use, is a generally L-shaped structure 110 the longer leg 112 of which is normally biased to incline to and over its shorter leg 114. To this extent it retains characteristics of the invention subject of applicant's U.S. Pat. No. 4,744,548, issued May 17, 1988 for Strut Retention Device. However, it will be seen from the foregoing and the following that as compared thereto it presents significant improvements in substance, structure, composition and function which afford a distinct advance in the art to which the present invention relates.

In this instance legs 112 and 114 are separate elements which are individually constructed and so designed that with an interconnection thereof such as herein set forth they individually and jointly provide a most stable device, when used for the purpose intended. The legs 112 and 114 are individually extremely light in weight yet highly resistant to compression and deformation and exhibit a particularly high load accomodating capacity.

Moreover, their construction and arrangement lends itself to a very easily achieved selective modification thereof to render it equally suitable in application to any one of a variety of control cylinders the size and stroke of which may differ. Specially advantageous features are found in both the configuration of the legs 112 and 114 and the means and method utilized in effecting the biased pivotally interconnected relation thereof.

Leg 114 is quite short and sturdy in construction. The face 116 to face 118 dimension thereof, which corresponds to its depth, is approximately one half that of its length. The major portion of the length of leg 114 extending from one end 120 thereof to its opposite end 139 has a bar shaped configuration and is substantially rectangular in cross section. Accordingly, the side surfaces 122 of this portion are parallel except for that which defines its outermost end 120 which has a hemispherical configuration. As seen in peripheral outline (FIG. 5) and in perspective (FIG. 4) the hemispherical surface defining end 120 is uniform in cross-section throughout its axial extent and, being formed on a uniform radius, this cross section appears in end view as a 180° arc the spaced ends of which are diametrally aligned and smoothly merge with and are directly extended by side surface portions 122 of leg 114. As should be obvious, faces 116 and 118 of leg 114 are parallel.

The remaining portion of the length of leg 114 has the shape of a rectangular "U", being comprised of a base portion 128 extending transversely of, perpendicular to and projecting equally from each of the side surface portions 122, at the ends thereof remote from end 120. Formed integral with and perpendicular to the base portion 128 at each of its extremities is a relatively short leg portion 129. The laterally spaced parallel leg portions 129 define with the inner surface 131 of their base 128 a rectangular pocket, which as will be seen, accommodates therein, between the leg portions 129, the generally rectangular block shaped base end portion of leg 112. The lateral extent of the base portion 128 and its inner surface 131 is bisected by a perpendicularly directed slit 126 which extends inwardly of the previously described bar shaped portion of leg 114 in parallel, equidistantly spaced relation to a portion of the length of its side surface portions 122 to intersect and open to and radially of a throughbore 124 in the body of leg 114 which is perpendicular to and opens from its opposite faces 116 and 118. Bore 124 is centered between and radially spaced from sides 122 and has that portion thereof most adjacent end 120 in concentric radially spaced relation thereto. The radial spacing is, in each instance, substantial in relation to the radius of bore 124.

Leg portions 129 are each distinguished by a transversely directed, stepped throughbore 161 the outer portions of which are enlarged to define therein an outwardly facing recessed shoulder. Throughbores 161 are directly aligned. Formed integrally with and perpendicular to surface 131 of base portion 128 are two tilt-like projections 133, one to either side of slit 126, equidistantly spaced therefrom and in equidistantly spaced parallel relation to leg portions 129 which laterally bound the inner surface portion 131 of base 128. The projected extremities of leg portions 129 are co-planar and mutually define end 139 of leg 114.

The leg 112 is provided by a slim longitudinally extended bar element which has narrow parallel sides 152, a substantially uniform, relatively narrow width and a substantially uniform cross-section from its outer extremity 144 to the remote surface 142 of the block-shaped portion thereof which defines its base extremity.

Approximately 95% of the length of leg 112 extending from its end 144 is substantially uniform and basically arcuate in cross-section and within the limits of its longitudinal extent its inner surface 149, in a transverse sense, is concave, formed on a uniform radius and its shape is such to be complementary and generally conform to the circumferential configuration of the piston rod and housing of the control cylinder to which the legs 112 and 114 must relate in use. In this instance the outermost surface of this basically arcuate cross-section is transversely undulated to produce thereon at and longitudinally of each of its lateral extremities a relatively shallow rib 154 and laterally centered therebetween a parallel rib 150 of greater depth. Thus, in this embodiment the ribs 154,150 are defined by the peaks and valleys 148 of the transversely extending undulations of the outer surface of leg 112.

The block shaped base portion of leg 112, which represents about 5% of its length, has that surface thereof which comprises part of the inner surface of leg 112 provided with two blind bores 169 which are directed inwardly thereof and perpendicular thereto in a laterally spaced relation. The bores 169 are laterally spaced on a common level which is in adjacent spaced parallel relation to surface 142. Lodged in each blind bore 169 is a bell-shaped end portion of a coil spring 165 which projects outwardly therefrom and perpendicular to the face of the block shaped portion of leg 112 from which bores 169 open. Further provided in said block-shaped base portion, at a level immediately above and in spaced relation to the level of springs 165 and the blind bores 169 in which they anchor, is a transversely directed throughbore 160 which opens from its respective sides 143. The construction and arrangement of bores 169 and springs 165 and that of throughbore 160 contributes to the formation of a strong, secure, stable and most effective joint between legs 112 and 114 as they are pivotally interconnected.

Attention is directed to the fact that the innermost end of of rib 150 merges with the apex of an arrowhead shaped axial extension 158 of the block-shaped base of leg 112. At the same time the opposite inner face of the block-shaped base is provided with an aligned similarly shaped smaller cavity 147. The purpose of arrowhead 148 and cavity 147 is to immediately and easily visually inform those assembling and installing this device of the invention as to the required orientation thereof in application and use.

The legs 112 and 114 may be formed of metal but in the embodiment illustrated they are preferably formed of plastic and in any case they are formed of a minimal amount of material and by virtue of their construction and arrangement endowed with a very high degree of load bearing strength for their size. At the same time they are highly resistant to compression and deformation.

Note is also made of the particular construction of leg 114 the form of which clearly demonstrates not only the mode of its easy application and snap-fit assembly to various piston rods the diameters of which may differ, within prescribed limits, but also an easily effected connection thereof to such a rod which firmly establishes one end portion thereof to form a secure compression and deformation resistant collar about the rod and the remainder of this leg in a rigid laterally and radially projected relation to the rod for an equally easy, firm, stable and secure pivotal interconnection therewith, in biased relation thereto, of leg 112. The bias on leg 112 as so interconnected to leg 114 is such to inherently cause it to normally incline to and over the length of leg 114 and condition it to inherently function as required in its application and use.

On an axial and direct assembly of leg 114 to the piston rod 136, in obvious manner, the portion of the piston rod to which it applies is essentially encompassed in one end portion thereof and approximately one half its length projects laterally and radially outward therefrom and its radially outermost limit is mutually defined by the projected end surfaces 139 of legs 129 which laterally bound the rectangular pocket defined therebetween. The base of this pocket is the bisected surface 131. Assembly of leg 112 to leg 114 is then simply and easily effected. The block-shaped base end portion of leg 112, being appropriately dimensioned, is then slip fit between legs 129 and inwardly of said pocket with the projected portions of springs 165 anchored in the blind bores in its inner face in leading relation thereto. In the course thereof, the projected extremities of springs 165 seat to the inner surface 131 immediately about and in closely spaced concentric relation to the tilt-like projections 133. On further pressured inward movement of said block shaped base of leg 112 springs 165 are definitively compressed and transversely extending bore 160 thereof is aligned with bores 161 in leg portions 129 of leg 114. At this point the threaded body of a bolt 167 is thrust through one of the bores 161 in leg 114, which is not tapped, freely through bore 160 in leg 112 and threadedly engaged in and extended through the following bore 161, which is tapped, to have the Allen shaped expanded head thereof seat to the recessed outwardly facing shoulder in the first bore 161 and a remote end portion thereof project beyond a similar shoulder in the outer end of tapped bore 161 providing an abutment surface for a lock nut applied to the projected extremity of the bolt. On appropriate adjustment of bolt 167 and applied nut, leg 112 so applied is positively interconnected with leg 114. Further, by reason of the fact that the diameter of bore 160 of the block shaped base of leg 112 is slightly larger than that of the body of bolt 167 which projects therethrough and the manner and nature of the interposition of springs 165 between the internested end portions of legs 112 and 114 these legs are not only pivotally stably and operationally related but provide a joint therebetween which is strong and effectively functions in the balanced distribution of applied loads in use of this embodiment of the invention.

Particular attention is directed to the fact that in assembling this preferred embodiment of the invention the attachment of leg 114 to and about the rod 136 of a control cylinder 130 is most positive and provides a full circumferential containment of that portion of the length of the rod to which it applies. Leg 112 is not and cannot be pivotally connected with leg 114 until such containment is effected and the means and manner of effecting its operative interconnection with leg 114 not only locks the device 110 in connection with piston rod 136 and control cylinder 130 but provides a most secure load accommodating connection between the legs 112 and 114 which contributes insurance as to their required safe and effective function.

In conventional use of control cylinder 130 within an automotive vehicle, whether in connection with a hatchback panel or a trunk lid, adapter 134 in connection with the cylinder housing 132 is pivotally hinged to a portion of the vehicle body or frame while adapter 140 is pivotally hinged to a complementary connector element fixedly related to the inner surface of the hatchback or the trunk lid, as may be required. The points of connection of the cylinder to the complementary connector elements on the vehicle body or frame and the hatchback or trunk lid will have a fore and aft alignment. When the hatchback or trunk lid is closed the function of the gas strut 130 is such that it conventionally provides that the rod 136 is forced into housing 132 and that the gaseous fluid in backing relation to its interconnected piston is pressurized. When a hatchback or trunk lid is opened, the energy stored in the pressurized fluid assists in projecting and maintaining the projected relation of the rod 136 and correspondingly the open condition of the vehicle closure element to which it connects. If for any reason there should be a loss of pressure fluid in the gas strut cylinder when the hatchback or trunk lid controlled thereby is in an open condition, such a closure element would fall, without warning. If at such time a person is engaged in loading or unloading a deck area of the vehicle to which the closure element relates, serious injuries could result. The solution to the significant problem presented thereby is optimally solved in use of the herein illustrated embodiment of the present invention. The application and installation of embodiments of the present invention should at this point be quite apparent since the manner of application and assembly thereof to the piston rod of a cylinder has been fully detailed in the foregoing description of the illustrative embodiment.

Not only should it now be adequately clear how simply and effectively the structure 110 may be applied to prevent a collapse of a cylinder such as the cylinder 130, but it should also be self evident there is a significant integrity and insurance provided in the form and construction of the structure 110 in application to a control cylinder such as cylinder 130. The construction and arrangement of the structure 110 provides a retention device which affords a significant load bearing capacity for the purpose intended.

Figures 1, 2:
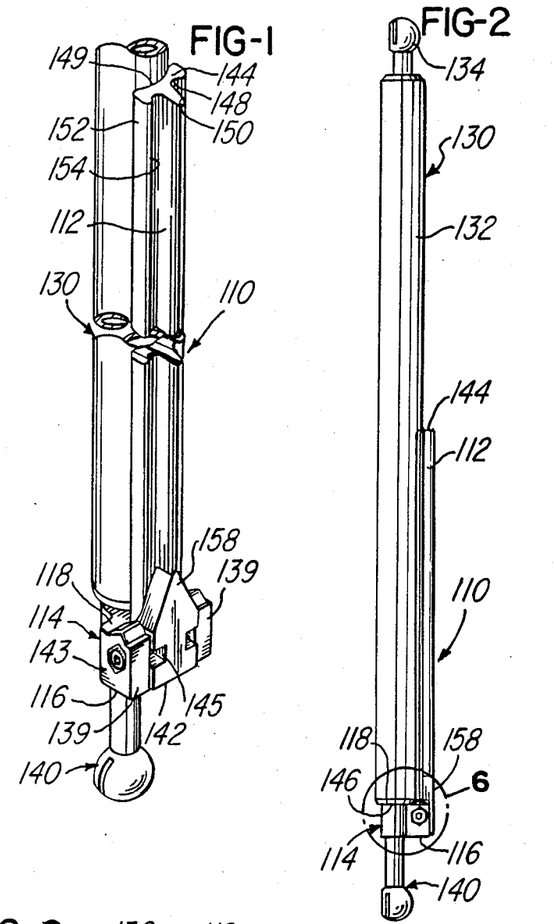
FIG. 1 is a perspective view of an illustrative embodiment of the invention applied to the piston rod of a control cylinder wherein the rod is in a relatively retracted condition with reference to its housing, under which condition the major portion of the length of the long leg of the generally L-shaped structure of this embodiment has the length thereof beyond its pivotally interconnected short leg extending lengthwise of and in a complementary, firm, bearing relation to the cylinder housing.
FIG. 2 is a side view of the structure illustrated in FIG.

Note that in use of the described embodiment of the invention, with piston rod 136 retracted within housing 132, to the extent permitted by the limiting axial length of said collar portion of arm 114, surface 118 of leg 114 abuts the annular end portion 146 of housing 130 (FIG. 2). At the same time that portion of the length of leg 112 beyond said collar is positioned in overlying relation to and extends immediately of and lengthwise of housing 132 from its end 146 to have an outer portion of the length of its inner surface 149 complementarily fit about and seat in firm bearing biased relation to the facing outer surface portion of housing 132, influenced to this end by the strong bias applied to the base end portion of leg 112 by springs 165, which are at this point quite compressed.

Figure 3:
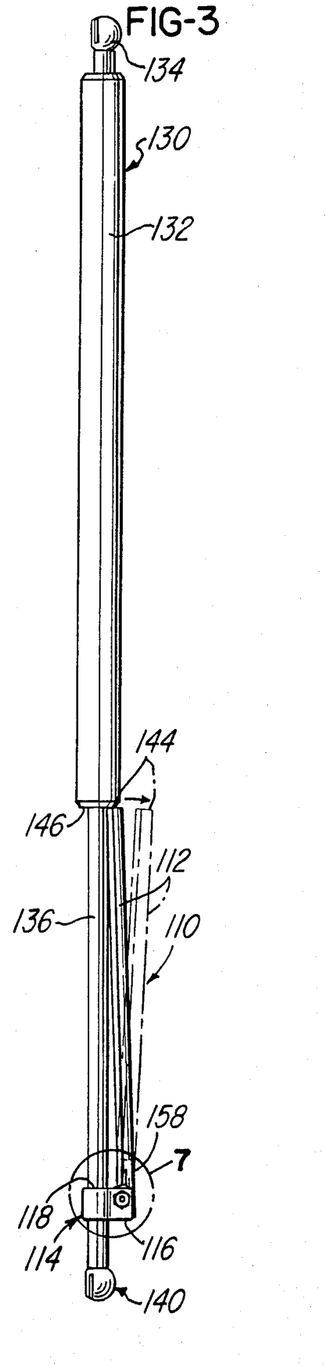
FIG. 3 is a view similar to that of FIG. 2 exhibiting the projection of said piston rod from its housing to an extent that the long leg of the L-shaped structure applied thereto has, cleared said housing and the projected extremity thereof has snapped inwardly to firmly bear on said piston rod immediately outward of and directly opposite the end of the housing from which the rod projects.
Figures 4, 5, 8:
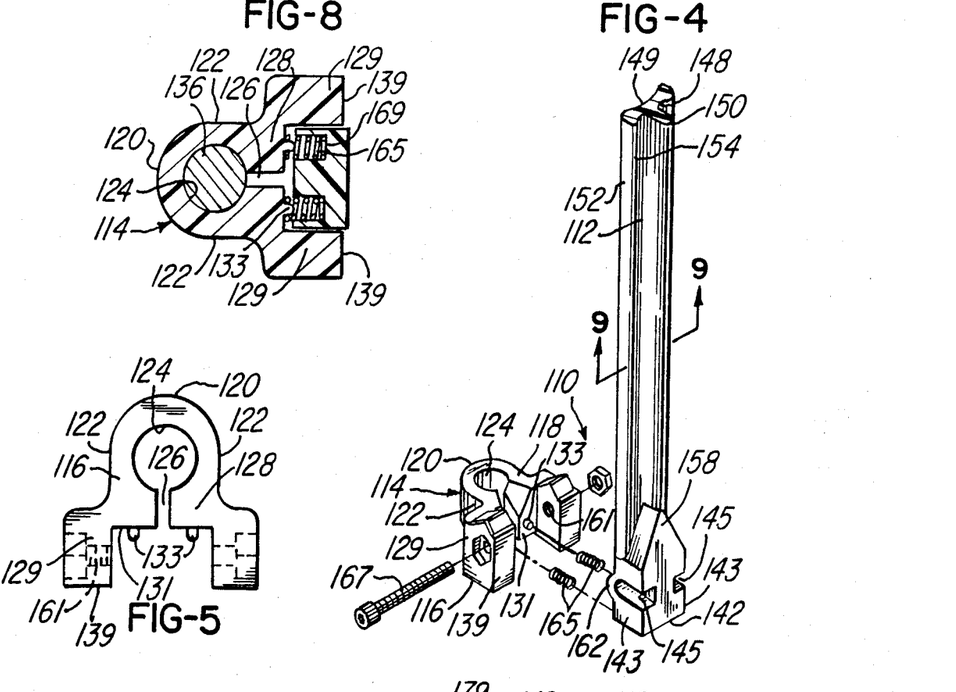
FIG. 4 is an exploded perspective view of the embodiment of the invention illustrated in FIGS. 1–3.
FIG. 5 is a view of the base surface of the short leg of the generally L-shaped structure shown in FIG. 4.
FIG. 8 is a sectional view taken on line 8—8 of FIG. 6.
Figures 6, 7:
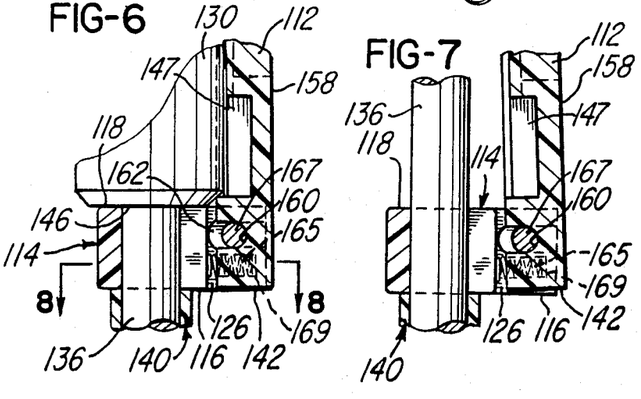
FIG. 6 is a longitudinal sectional view of that portion of said L-shaped structure designated by the numeral 6 in FIG. 2.
FIG. 7 is a longitudinal sectional view of that portion of said L-shaped structure designated by the numeral 7 in FIG. 3.
Figure 9:
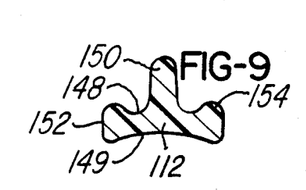
FIG. 9 is a sectional view taken on line 9—9 of FIG. 4.

As should be obvious, once rod 136 is further projected to the extend end 144 of leg 112 clears end 146 of housing 132, leg 112, being so conditioned, inherently instantaneously snaps radially inward to set a portion of its surface 149 in a complementarily fit, firmly, biased bearing relation to and about a portion of the length of rod 136. As this occurs, end surface 144 inherently provides a dominating abutment surface essentially the full extent of which is directly aligned with and in facing relation to annular end surface 146 of housing 132. The effect of this is to positively establish a new limit to retraction of rod 136 effective in the example illustrated to hold rod 136 from retracting from a position which is very close to that defining the limit of its projection (FIG. 3). From this point, in which end 144 will be very close or abutted to end surface 146 of housing 132, the outer end portion of leg 112 must be displaced from and pivoted outwardly from rod 136, against the bias thereon inherently imposed by springs 165, to clear annular end surface 146 of cylinder housing 132 before rod 136 can be further retracted. Once this is done, retraction commences, at that point end 144 extends beyond surface 146, leg 112 is then released to inherently and automatically swing inwardly to and bear firmly on the outer side surface portion of housing 132 and subsequent move along the length thereof to the extent permitted by the retraction of rod 136 the limit of which is defined by the abutment of surface 118 of leg 114 to end surface 146 of housing 132.

It is believed the unique and beneficial construction and interrelation of parts of the illustrated device clearly demonstrate that embodiments of the present invention are advantageously suited not only for use in applications and environments such as particularly detailed with reference to the described illustrative embodiments but also well suited and highly suited for a multitude of applications and for use in many other applications and environments with equal benefits accruing to their users.

Figure 10:
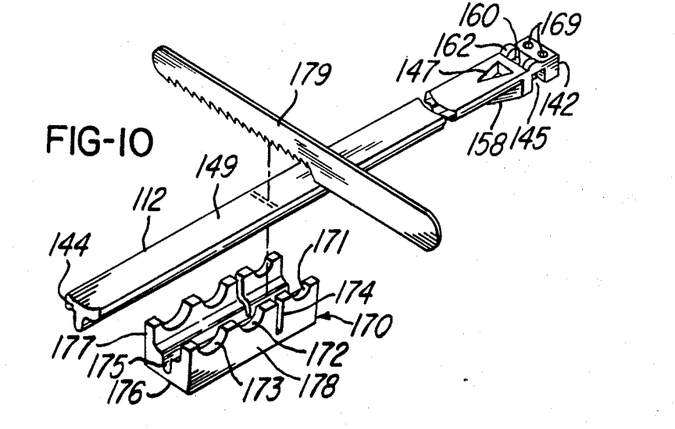
FIGS. 10 and 11 are views which demonstrate elements of a kit per the present invention and their application to an embodiment of the invention included therewith to selectively adapt it to meet the requirements of its intended use.
Figure 11:
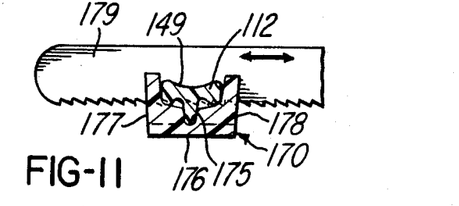

FIGS. 10 and 11 demonstrate an ancillary aspect of the invention as related to the embodiment of FIGS. 1–9, namely that a significant commercial aspect thereof is that embodiments thereof may be provided for individual users in kit form and at minimal cost and in a manner that the purchaser can selectively adapt the same embodiments to their use in connection with control cylinders which have pistons which differ in diameter and the length of their required stroke. As demonstrated, such a kit would include, in addition to elements of one or more embodiments of the invention, a channel shaped miter box 170 which is generally U-shaped in transverse section. Miter box 170 comprises a longitudinally extended base portion 176 and, at its lateral extremities, coextensive longitudinally extended upstanding side walls 178 which slightly diverge as they project upwardly therefrom. The inner surface of the base of said box 170 is configured in transverse and longitudinally extending directions to complementarily and solidly seat a portion of the length of the transversely undulated outer surface portion of leg 112 (FIGS. 10 and 11) to present the inner portion 149 thereof uppermost longitudinally. As seen in FIG. 11, under such condition a portion of the depth of rib 150 including its peak projects within and is laterally contained in a groove 175 in the inner surface of base 176 which is centered between sides 178 thereof and runs the length of box 170, while ribs 154 have the peaks thereof abutted to the lateral extremities of said inner surface with the side surfaces 152 by which they are bounded bearingly contained by inner surface portions of side walls 178. Side walls 178 are each provided with a series of longitudinally spaced hemicylindrically formed notches 171, 172 and 173 in its upper edge, each of different radius, and a slit 174 directed inwardly thereof and perpendicular thereto between and in equidistantly spaced relation to notches 171 and 172. As so provided, notches 171, 172 and 173 as well as slits 174 are paired in a transversely aligned relation. The notches are sizing notches for use in immediately determining the diameter of the piston rod of the control cylinder to which the device(s) of the invention included in the kit must apply.

Leg 112 of the device(s) in the kit will have a maximum size, particularly as to its length, correlated to the type and range of dimension of the diameter and length of stroke of the various piston rods and the various cylinders to which the kit may be applied for use. Included in the kit is a saw blade 179. Where the length of leg 112 must be shortened to suit the requirements of a particular control cylinder, all one needs to do is set the leg in the miter box, in the orientation and manner previously described, after marking the leg with a transverse cut-off line appropriate to requirements, and aligning this line with slits 174. Then, utilizing saw blade 179, excess length of leg 112 may be quickly and easily cut off in seconds, very precisely using reasonable care. It is also contemplated, per the present invention that embodiments thereof in the nature of that exemplified in FIG. 1–11 or the mechanical equivalent thereof when sold in the unique kit form of the invention may include within such a kit a number of selectively formed and sized legs 114 the use of which could effectively adapt the device(s) therein to a particular application which so requires. As will be self evident, this is not only a kit which can be provided at reasonable cost but also one can be equally utilized by those versed in the art to which the invention relates and by the most untutored of individuals in the marketplace.

It will be apparent from the foregoing that the illustrative embodiments of the invention evidence features of novelty and an original and effective answer to a need as well as the fact they are susceptible to a modification of their form, construction and arrangement of parts without departing from the principles involved or sacrificing their inherent advantages and benefits. It should also be understood invention embodiments are not limited to the specific features shown and that the means and construction of those herein disclosed are not to be construed as limiting. The invention is therefore to be comprehended as including any of its forms or modifications within the legitimate and valid scope of the appended claims.

The embodiments of the invention in which applicant claims an exclusive property or privilege are defined as follows:

1. Apparatus for application to the piston rod of a control cylinder to selectively limit and prevent the retraction of its piston rod into its housing comprising two distinct elements, one said element being bar-shaped, longitudinally extended and having, with reference to its application, inner and outer surfaces, inner and outer ends, a block shaped base portion to its inner end and a major portion of the length of its inner surface to the outer end thereof transversely concave and substantially uniformly arcuate in cross section, the other of said elements having a substantial thickness, being short in length, having therein adjacent one end thereof a through aperture shaped to accommodate a portion of the piston rod to which it applies and at the opposite end thereof a recess accommodating therein said base portion of said one element, means releasably interconnecting and pivotally interrelating said base portion of said one element with and in nesting relation to said recess in said opposite end of said short element and spring means interposed between said base end portion of said one element and the said opposite end portion of said short element to firmly and resiliently bias said longitudinally extended bar-shaped element to normally position over and in inclined relation to said short element to inherently and firmly bias at least a portion of said transversely concave and substantially uniformly arcuate surface portion of said one element into a portion of the circumferential extent of the piston rod of the cylinder to which said short element applies when at least a predetermined portion of the length of such piston rod is extended from the cylinder of which it forms a part.

2. Apparatus as in claim 1 furnished as a kit wherein said one element is a slim linearly extended bar-shaped element which is relatively thin from face to face thereof and narrow in width substantially from one end thereof to the other, and said one element is constructed and arranged to be adjustable to meet the needs of one of a number of possible applications thereof and means are included to selectively adjust this element in accordance with the length of stroke of the piston rod of the control cylinder to which said apparatus must apply in use.

3. Apparatus as in claim 2 wherein said means to selectively adjust said said long leg includes a channel shaped member embodying means to gage the piston rod of the cylinder to which said short leg of said L-shapied structure is to apply in use thereof.

4. Apparatus as in claim 1 characterized in that the outer surface of said one element has thereon a longitudinally extended, substantially laterally centered, outwardly projected rib which imposes a controlling influence on the function of said one element in its application to the piston rod to which said apparatus relates in use.

5. Apparatus as in claim 1 characterized in that said other element has a slit which intersects said through aperture and provides therein means to effect a snap fit of said other element to and in a secure encompassing relation to a projected portion of the length of the piston rod of that cylinder to which said apparatus applies in use.

6. Apparatus as in claim 5 characterized in that said slit simultaneously intersects said recess in said through aperture in said other element.

7. Apparatus as in claim 4 characterized in that said base portion of said one element, as it is pivotally connected to said other element, is positioned within said recess immediately of said slit to preclude the detachment of said other element from the piston rod to which it relates in use.

8. Apparatus as in claim 1 characterized in that the major portion of the length of said outer surface of said one element, to the outer end thereof, is distinguished by laterally spaced longitudinally extending rib-like projections.

9. Apparatus as in claim 8 wherein said outer surface of said bar is transversely undulated and said rib-like projections are formed by laterally spaced peaked portions of said undulations.

10. Apparatus as in claim 8 characterized in that said rib-like projections are laterally spaced and non uniform as to their depth.

11. Apparatus as in claim 10 characterized in that said projections include a central longitudinally extending projection which runs a major portion of the length of said outer surface of said one element and laterally flanking parallel projections at the lateral extremities of said outer surface and said central rib-like projection has a greater depth than the other of said projections from said outer surface of said one element.

12. Apparatus as in claim 1 characterized in that said elements are formed of plastic, very light in weight and to have a very high degree of load bearing weight for their size and said one element embodies means imposing a controlling bias of at least the outer end portion of said one element to the piston rod to which it relates under applied load and the thickness of said short leg dictates a predetermined projection of the piston rod from the housing of the cylinder of which it forms a part, even in a fully retracted position thereof.

13. Apparatus as in claim 1 characterized in that said pivotally interconnected elements as secured to the piston rod of the control cylinder to which they relate present at said outer end of said one element and said upper surface of said other element longitudinally spaced surface portions thereof which, as and when said rod is sufficiently extended from the housing of the control cylinder to which said apparatus applies, present means in line with the end surface of the housing from which the rod projects to selectively limit the movement of the projected portion of the rod into the cylinder housing.

14. Apparatus as in claim 1 wherein said one element is constructed and arranged, in a retracted condition of the rod to which it relates, to extend along and in tightly biased bearing relation to the cylinder housing and dictate a conditioning thereof to automatically move inwardly to and firmly bear upon said rod, in a firmly biased relation thereto on a predetermined projection of said rod from its housing and said outer surface of said one element is further distinguished by longitudinally extending transversely spaced undulations the peaks of which define rib-like projections which exert a controlling influence to effect a firmly biased relation of at least a portion of the length of said inner surface of said one element to and along the length of the piston rod and the cylinder housing to which it relates.

15. Apparatus for application to the piston rod of a control cylinder to selectively limit and prevent the retraction of its piston rod into the cylinder housing comprising two distinct elements, one said element being a slim linearly extended bar-shaped element which is relatively thin from face to face thereof and narrow in width substantially from one end thereof to the other, said one element having, with reference to its application to a piston rod, inner and outer surfaces and a major portion of the length of its inner surface transversely concave and substantially uniformly arcuate in cross section, one of said ends of said one element being a base end and the other an upper end thereof as applied in use, the other of said elements being a coupling means to which said base end of said one element is pivotally interconnected in a recessed relation thereto, said coupling means having a substantial thickness, being short in length and embodying means for a secure snap fit interconnection thereof to and about a portion of the piston rod to which it applies, means interposed and contained between said base end of said one element and portions of said coupling means to firmly and resiliently bias said one element to normally position over and in inclined relation to said coupling means and inherently and firmly bias at least a portion of said transversely concave and substantially uniformly arcuate surface portion of said one element into a portion of the circumferential extent of the piston rod of the cylinder to which said short element applies when at least a predetermined portion of the length of such piston rod is extended from the cylinder of which it forms a part.

16. Apparatus as in claim 15 wherein said coupling means is bar shaped and has therein a through bore and a bifurcation which intersects said through bore and adapts it for a snap fit secure mount to and about a portion of the length of the piston rod to which it relates in use, said bifurcation providing laterally spaced arms at one end thereof between which said base end portion of said one element is positioned and interconnected therewith in the pivotal connection thereof to said coupling means.

17. Apparatus as in claim 15 further characterized by smoothly contoured rib means being formed on and extending substantially the length of said outer surface of said one element to influence the biased containment of at least the outer end portion of its transversely concave inner surface in a closely biased pressured engagement to a portion of the circumferential extent of the piston rod to which it relates in use.

* * * * *

UNITED STATES PATENT AND TRADEMARK OFFICE
CERTIFICATE OF CORRECTION

PATENT NO. : 4,890,703

DATED : January 2, 1990

INVENTOR(S) : Richard C. Hathaway

It is certified that error appears in the above-identified patent and that said Letters Patent is hereby corrected as shown below:

Col. 4, line 13, "an" is corrected to read -- a --;

line 30, "aid" is corrected to read -- said --;

line 38, "thereto, said" is corrected to read -- thereto. Said --.

Col. 8, line 42, "of" (second occurrence) is deleted.

Col. 13, line 22 (Claim 3, line 2) "said" (second occurrence) is deleted;

line 25 (Claim 3, line 5), "shapied" is corrected to read -- shaped --.

UNITED STATES PATENT AND TRADEMARK OFFICE
CERTIFICATE OF CORRECTION

PATENT NO. : 4,890,703

DATED : January 2, 1990

INVENTOR(S) : Richard C. Hathaway

It is certified that error appears in the above-identified patent and that said Letters Patent is hereby corrected as shown below:

```
Col. 6, line 19, following "Fig.", insert -- 1 --;

line 23, following "has", delete the comma.

Col. 7, line 58, "tilt" is corrected to read -- tit --.

Col. 9, line 24, "tilt" is corrected to read -- tit --.

Col. 10, line 59, "extend" is corrected to read -- extent --.

Col. 13, line 43 (Claim 7, line 1), "4" is corrected
                                    to read -- 6 --.
```

Signed and Sealed this

Fifth Day of February, 1991

Attest:

HARRY F. MANBECK, JR.

Attesting Officer

Commissioner of Patents and Trademarks